March 24, 1925.

C. TIBBOTT

BICYCLE SEAT POST

Filed May 21, 1923    2 Sheets-Sheet 1

1,530,705

INVENTOR
Charles Tibbott
By Baker & Macklin
ATTORNEYS

March 24, 1925. 1,530,705
C. TIBBOTT
BICYCLE SEAT POST
Filed May 21, 1923 2 Sheets-Sheet 2
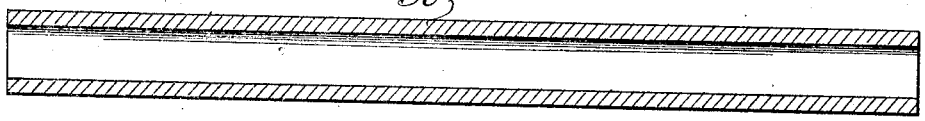
Fig. 7
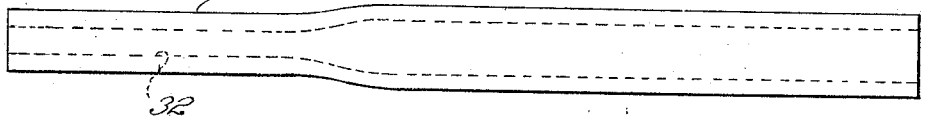
Fig. 8
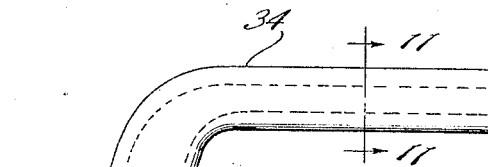
Fig. 9
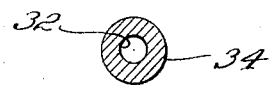
Fig. 10
Fig. 11
INVENTOR
Charles Tibbott,
By Baker Mackling
ATTORNEYS Patented Mar. 24, 1925.

1,530,705

UNITED STATES PATENT OFFICE.

CHARLES TIBBOTT, OF LAKEWOOD, OHIO.

BICYCLE SEAT POST.

Application filed May 21, 1923. Serial No. 640,372.

*To all whom it may concern:*

Be it known that I, CHARLES TIBBOTT, a citizen of the United States, residing at Lakewood, in the county of Cuyahoga and State of Ohio, have invented a certain new and useful Improvement in Bicycle Seat Posts, of which the following is a full, clear, and exact description, reference being had to the accompanying drawings.

My invention has for its object the production of a tubular supporting angle member, particularly adapted for use as a bicycle seat post, that is stronger and less liable to breakage, and capable of being more cheaply manufactured, than existing articles of this class.

Heretofore it has been the practice in the production of the better grade of bicycle seat posts to weld a solid forging comprising the upper angle portion of the post to a tubular stem portion adapted to be inserted in the inclined tubular socket of the bicycle frame. The normally horizontal portion of such forging, adapted to accommodate the clamping means on the saddle, is of sufficient size and strength when made with a relatively small diameter and is ordinarily enlarged at the angle to form a short inclined solid stub of a diameter equal to that of the tubular stem to which it is welded, and which necessarily has an exterior diameter no greater than the interior diameter of the bicycle frame tubing in which such stem is adapted to be clamped. This forging is, of course, more expensive than tubing, and partly on account of the size limitations, a sufficiently strong joint between the solid forging and the tube is difficult to secure, and moreover constitutes the weak spot in the finished article.

My invention comprises an improved article of this class and an improved method for its manufacture. Instead of welding a forging having a reduced end to a separate tubular stem, I find a stronger seat post may be made at less cost by using a one piece length of tubing, with or without reinforcing means depending upon the gauge of tubing employed and the strength desired. The saddle clamp engaging portion or arm of lesser diameter than the stem is then formed by swaging one end to a thicker gauge. The tube is then bent at the proper angle adjacent to the taper formed between the swaged and unswaged portions, to form the completed article.

The invention is hereinafter more fully described in connection with the accompanying drawings and the essential characteristics thereof are summarized in the claims.

Figure 1:
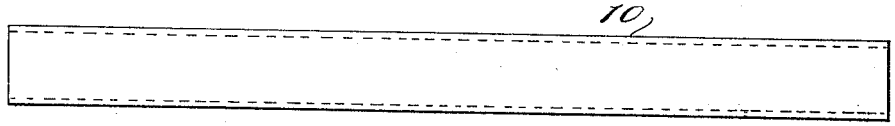
Figure 2:
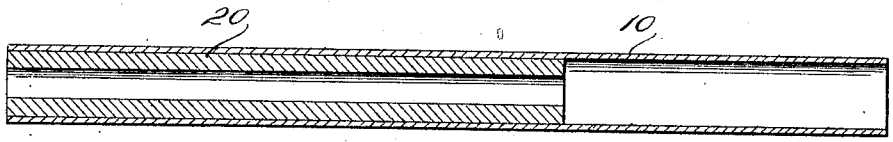
Figure 3:
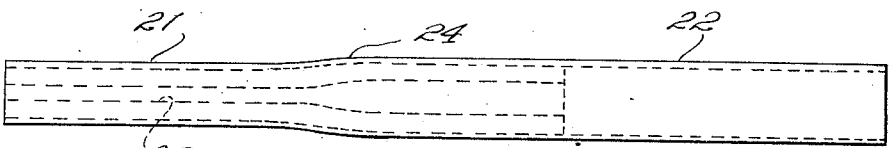
Figure 4:
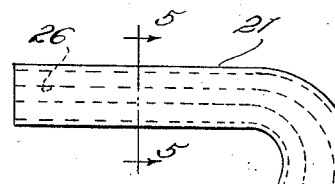
Figure 5:
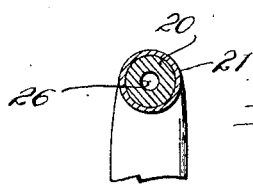
Figure 6:
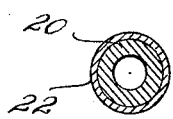

In the drawings, which illustrate two embodiments of the invention, Fig. 1 is an elevation of a length of tubing of proper dimensions to constitute a bicycle seat post; Fig. 2 is a central longitudinal section through such tubing showing a tubular reinforcing member positioned in one end; Fig. 3 is an elevation of the tube after one end portion has been swaged to reduced diameter; Fig. 4 is an elevation of the finished post after being bent forwardly at the proper angle; Figs. 5 and 6 are transverse sections on the corresponding lines of Fig. 4; Fig. 7 is a longitudinal section through a length of tubing of heavier gauge, requiring no reinforcement; Fig. 8 is an elevation of the same after it has been swaged; Fig. 9 is an elevation of the same after it has been bent rearwardly to form a different type of seat post; and Figs. 10 and 11 are transverse sections on the corresponding lines of Fig. 9.

As shown in Figs. 1 to 6, 10 designates a length of steel tubing of a diameter to fit within the tubular frame of the bicycle for which the finished seat post is adapted to be used. The walls of such tube 10 may be comparatively thin being preferably of #17 gauge. The length, of course, will vary according to the length of post to be made; a very popular size being made from 9½ inches of $\frac{13}{16}''$ tubing. Reinforcing tubing 20 which may satisfactorily comprise a 5" length of stock $\frac{11}{16}''$ in diameter and #12 gauge, is fitted at one end. The tubing thus reinforced is then swaged to form the normally horizontal saddle engaging portion of the finished seat post, as designated by the numeral 21, the length of the swaged portion being roughly 3 inches. The junction between such portion and the unswaged portion 22 constituting the stem of the post, comprises the tapered portion 24, approximately one inch in length. During such swaging process, the diameter of the portion 21, is reduced ordinarily to the standard size of ⅝", the opening 25, within the tube 20 being also reduced in size as shown at 26. The portion or arm 21, is then bent preferably about a ¾" radius to the proper angle to constitute the saddle engaging portion of the post which should be horizontal when the stem portion 22 is fixed within the frame of the bicycle. In the type of post illustrated in Fig. 4 the angle between the arms is substantially 73°. After bending, the surface of the completed post may be finished in any desired manner.

A modified form of construction, as also a different type of seat post, is illustrated in Figs. 7 to 11. In this embodiment of my invention a section of tubing 30, which may be of the same length and diameter, but preferably of heavier gauge (#12 being satisfactory) is employed. With stock of such gauge no reinforcing is necessary. The tube 30 is swaged to form the saddle engaging portion of the seat post as in the embodiment first described. Since the thickness of the tube 30 is less, however, than the combined thickness of the tubes 10 and 20 constituting the reinforced portion in the embodiment first described, a larger opening 32, will thus be maintained throughout the reduced portion 34, as clearly illustrated in Figs. 8 and 11. In Fig. 9 is illustrated the swaged portion 34 of this heavier tube 30, bent to a less extent and adapted to extend rearwardly and horizontally when the stem portion 35 is fixed within the bicycle frame to form a post adapted for use when it is desired to mount the saddle in a more rearward position relative to the frame than is possible with the type illustrated in Fig. 4. A further bending would be effected to produce the type of post shown in Fig. 4.

It will be apparent that my angle post thus manufactured may be produced very economically. Short waste lengths of relative inexpensive tubing may be employed exclusively, and by the use of the swaging process such stock may be shaped and reinforced at a single operation and without waste, thus avoiding the difficulties incident to the production of the welded product. I have found in actual test that my construction will withstand substantially twice as great a load before breaking as an ordinary seat post comprising a forging welded to a tubular stem.

Having described my invention, I claim:—

1. An angle post comprising a tubular member having its arms of different diameter and gauge, and connected by a tapered portion.

2. A bicycle seat post, tubular throughout its length, having a stem portion and a saddle engaging portion of different diameter and gauge, said portions being integrally connected by a tapered portion.

In testimony whereof, I hereunto affix my signature.

CHARLES TIBBOTT.